Patented Feb. 13, 1934

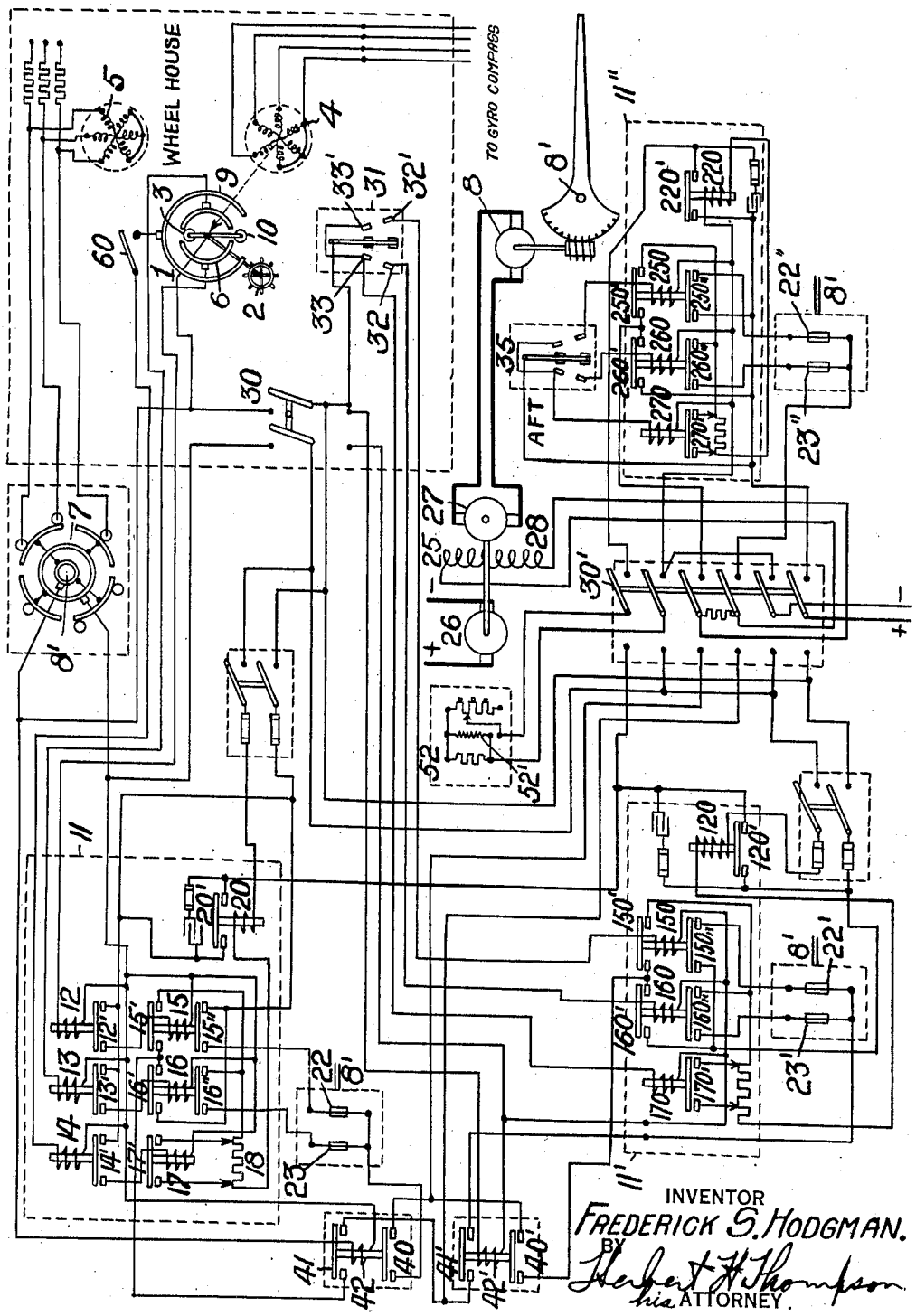

1,946,693

UNITED STATES PATENT OFFICE 1,946,693

ELECTRICAL STEERING DEVICE FOR SHIPS

Frederick S. Hodgman, Glen Rock, N. J., assignor to Sperry Gyroscope Company, Inc., Brooklyn, N. Y., a corporation of New York Application November 25, 1930
Serial No. 497,993

3 Claims. (Cl. 172—282)

This invention relates to electrical steering devices for ships and other dirigible vehicles, and more especially to a type of steering gear designed to automatically steer a ship. According to the present invention, a plurality of entirely distinct control units are provided in the pilot house so that the ship may be controlled by any one of said units. Preferably one of the units is of the follow-up type and the other of the hard-over type of rudder control, and into the follow-up type is incorporated the automatic steering connection.

The drawing shows a wiring diagram in simplified form of the electrical control between the pilot house and the rudder. The follow-up controller is shown at 1, the pilot governing the course of the ship through the small steering wheel 2 connected to the trolley contactor 3. The automatic control from the gyro-compass may be brought in through the repeater motor 4 also connected to the trolley contactor 3 through a differential (not shown). The follow-up from the rudder is brought in through the repeater motor 5 which may be connected to turn the reversing segments 6 on the controller. The repeater motor 5 is shown actuated from the follow-up transmitter 7 driven from the shaft 8' of the steering motor 8. Preferably the controller is designed to operate the motor at a greater speed when the handle 2 is turned fast. For this purpose the controller is provided with a second segmental contact 9 with which the auxiliary control 10 comes into contact when the trolley moves through more than a predetermined angle with respect to said segment. This action is under the control of the operator by speed switch 60, so that the two-speed control may be cut out if desired.

The follow-up controller governs the steering engine through the control panel 11. Since the trolley is only adapted to handle small currents and voltages, a double relay system is provided, the coils 12, 13 and 14 controlled from the controller operating clapper switches 12', 13' and 14' respectively. These switches in turn close circuits through a second group of relay coils 15, 16 and 17, which operate clapper switches as follows: Coil 15 operates switches 15' and 15" to send current in one direction through the field 28 of generator 27, coil 16 controls switches 16' and 16" to send current in the opposite direction through said coils, and coil 17 operates speed control switch 17' for varying the strength of field 28. Switch 17' governs the motor speed by short-circuiting the resistance 18 in series with the generator field 28. Another coil 20 in the same line governs the clapper switch 20' which controls the brake solenoid 52, hereinafter described. Limit switches 22 and 23 are also provided at the rudder for breaking the motor circuit when the limit of the rudder position is reached. These switches are operated when the rudder reaches the limit of its position in either direction but leave the line closed on the other side for the return of the rudder.

The steering motor 8 is shown as controlled both as to speed and direction from a motor generator set 25 continuously driven by the motor 26. The direction and amount of current supplied by the generator 27 of this set to the motor are controlled entirely by controlling the direction and strength of the separately excited field 28 of the generator 27. For stopping the motor quickly when the field of the generator is killed, I provide a solenoid brake 52 which is held open only so long as current flows through coil 52' by switch 20' controlled from coil 20. The field control may be placed either on the follow-up controller or on the hard-over controller by double throw multiple switch 30 which operates in one position clapper switches 40, 41 through winding 42. In the other position, switches 40', 41' are operated to place the control on controller 31.

I prefer to provide an entirely independent electric system for the hard-over controller 31. This controller is shown as having two positions on each side of the position of rest, namely, against switch point 32 or 32' for slow speed operation in one direction or the other and switch points 33, 33' for high speed operation in one direction or the other. Since these switches may carry heavier currents than the contacts 1 to 3, these switches may directly work the solenoids 150, 160 and 170, the first two of which control the clapper switches 150' and 150", 160' and 160", corresponding to solenoids 15, 16 and 17 and switch 15', 15" and 16', 16" on the follow-up control panel 11, the former, however, being located on a separate control panel 11'. The last named coil 170 controls speed control switch 170' and coil 120 controls switch 120' which governs the solenoid brake 52 as before. Likewise limit switches 22', 23' are operated as before from the rudder shaft 8' or otherwise.

In addition to the above I may provide a hard-over controller 35 at another point on the ship, say aft, near the rudder. This controller may operate through an entirely independent control panel 11″ which may be in all respects similar to 11′. This controller is thrown in by multi-pole switch 30′. My new steering system, therefore, is virtually trouble proof as far as electrical circuits are concerned, since three independent controls are provided for the steering motor, any one or even any two of which may be out of order and still the ship may be steered satisfactorily.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. An electrical steering system for automatic steering for ships including a follow-up compass-controlled controller and an independent hard-over controller in the wheel house, multi-speed contacts on each, an independent electrical control system between each controller and the steering motor, and means in the wheel house for throwing the control from one controller to the other.

2. An electrical steering system for automatic steering for ships including both a follow-up and a hard-over controller in the wheel house, an independent electrical control system between each controller and the steering motor including independent limit switches for each, and means in the wheel house for throwing the control from one controller to the other.

3. An electrical steering system for automatic steering for ships including a follow-up compass-controlled controller and an independent hard-over controller in the wheel house, an independent electrical control system between each controller and the steering motor, means in the wheel house for throwing the control from one controller to the other, an additional hard-over controller located aft, a control system independent of the other two between said aft controller and the steering motor, and means aft for throwing the control from either of said forward controllers to the aft controller.

FREDERICK S. HODGMAN.